(12) United States Patent
Schiplage et al.

(10) Patent No.: US 11,053,398 B2
(45) Date of Patent: Jul. 6, 2021

(54) PRINTABLE INK MIXTURE, METHOD FOR PRODUCING A COLORED OVERPRINT, AND USE OF THE INK MIXTURE

(75) Inventors: Matthias Schiplage, Gersthofen (DE); Ewald Poesl, Kissing (DE); Matthias Schmidt, Neusaess (DE)

(73) Assignee: LEDVANCE GMBH, Garching (DE)

( * ) Notice: Subject to any disclaimer, the term of this patent is extended or adjusted under 35 U.S.C. 154(b) by 0 days.

(21) Appl. No.: 14/007,332

(22) PCT Filed: Apr. 4, 2012

(86) PCT No.: PCT/EP2012/056193
§ 371 (c)(1),
(2), (4) Date: Sep. 25, 2013

(87) PCT Pub. No.: WO2012/136716
PCT Pub. Date: Oct. 11, 2012

(65) Prior Publication Data
US 2014/0020586 A1 Jan. 23, 2014

(30) Foreign Application Priority Data
Apr. 5, 2011 (DE) .......................... 102011006758.2

(51) Int. Cl.
| | | |
|---|---|---|
| *C09D 11/02* | (2014.01) | |
| *C04B 41/50* | (2006.01) | |
| *C03C 17/00* | (2006.01) | |
| *C04B 41/85* | (2006.01) | |
| *C04B 41/00* | (2006.01) | |

(Continued)

(52) U.S. Cl.
CPC ............ *C09D 11/02* (2013.01); *C03C 17/008* (2013.01); *C04B 41/009* (2013.01); *C04B 41/5092* (2013.01); *C04B 41/85* (2013.01); *C09D 11/033* (2013.01); *C09D 11/037* (2013.01); *B41M 1/34* (2013.01); *C03C 2217/485* (2013.01); *C03C 2217/72* (2013.01); *C03C 2218/119* (2013.01)

(58) Field of Classification Search
None
See application file for complete search history.

(56) References Cited

U.S. PATENT DOCUMENTS

| | | |
|---|---|---|
| 3,982,046 A | 9/1976 | Mason et al. |
| 3,984,590 A | 10/1976 | Mason et al. |

(Continued)

FOREIGN PATENT DOCUMENTS

DE     4407366 A1     9/1995

OTHER PUBLICATIONS

English abstract of DE4407366A1, dated Sep. 21, 1995.

(Continued)

*Primary Examiner* — Joshua D Zimmerman
(74) *Attorney, Agent, or Firm* — Hayes Soloway P.C.

(57) ABSTRACT

A printable ink mixture may include: a medium, orthophosphoric acid, at least one metal oxide, and at least one pigment. A method for producing a color print on a glass or ceramic surface may include: producing an ink mixture including a medium, orthophosphoric acid, at least one metal oxide, and at least one pigment, applying the ink mixture to the glass or ceramic surface, removing the medium from the ink mixture, and baking the ink mixture on the glass or ceramic surface to produce the color print.

14 Claims, 1 Drawing Sheet

(51) Int. Cl.
*C09D 11/037* (2014.01)
*C09D 11/033* (2014.01)
*B41M 1/34* (2006.01)

(56) References Cited

U.S. PATENT DOCUMENTS

| | | |
|---|---|---|
| 4,005,232 A | 1/1977 | Colebourne et al. |
| 4,147,823 A | 4/1979 | Lavallee |
| 5,096,773 A * | 3/1992 | Sakamoto .................. C08J 5/18 428/323 |
| 2003/0089271 A1 | 5/2003 | Hirano et al. |
| 2007/0017402 A1 | 1/2007 | Jordens et al. |
| 2007/0253884 A1 * | 11/2007 | Liu ........................ C01B 33/183 423/337 |
| 2008/0145564 A1 * | 6/2008 | Allam ...................... C09D 7/63 427/514 |
| 2009/0181242 A1 * | 7/2009 | Enniss .............. B32B 17/10018 428/332 |

OTHER PUBLICATIONS

Magdassi, "The Chemistry of Inkjet Inks", Chapter 2, "Ink Requirements and Formulations Guidelines", World Scientific Publishing Co. Pte Ltd., 2010, 23 pages.

Pal and Fleming, "The Study of Ink Pigment Dispersion Parameters", The Hilltop Review, vol. 2, 2006, 11 pages.

\* cited by examiner

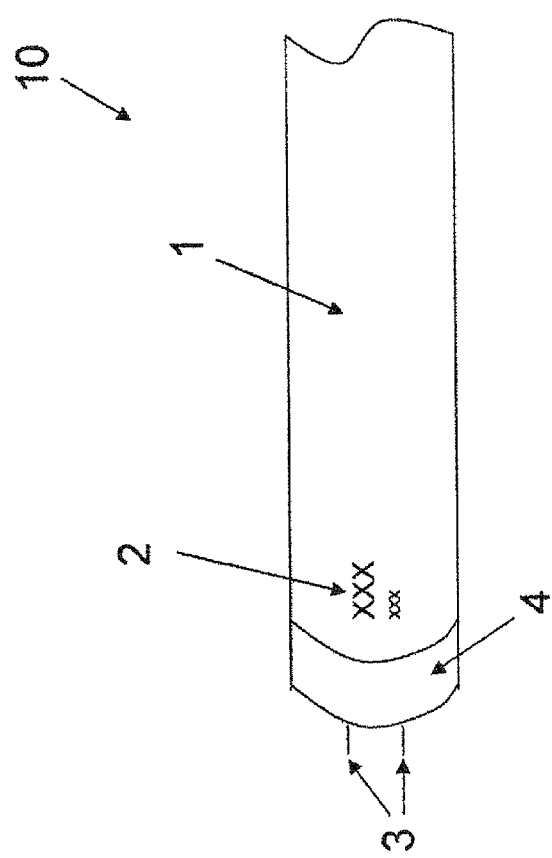

PRINTABLE INK MIXTURE, METHOD FOR PRODUCING A COLORED OVERPRINT, AND USE OF THE INK MIXTURE

RELATED APPLICATIONS

This applications is a national stage entry according to 35 U.S.C. § 371 of PCT application No.: PCT/EP2012/056193 filed on Apr. 4, 2012, which claims priority from German application No.: 10 2011 006 758.2 filed on Apr. 5, 2011.

TECHNICAL FIELD

Various embodiments relate to a printable ink mixture, to a process for producing a color print on a glass or ceramic surface and to the use of the ink mixture for a color print on luminous bodies.

BACKGROUND

For color markings on glass or ceramic surfaces, for example luminous bodies, durable, weathering- and chemical-resistant prints are desirable. To date, for example, lead borate-copper oxide pastes have been used for such purposes, but these have to be classified as toxic (T) and environmentally hazardous (N) because of their lead content and thus make particular demands on storage, processing and environmental protection. Some of the lead-free preparations known to date have insufficiently stable viscosity and/or are suitable only for a few selected pigments. In addition, the production of such inks entails costly and inconvenient grinding and dispersion processes.

SUMMARY

In one embodiment, a printable ink mixture including a medium, orthophosphoric acid, at least one metal oxide, and at least one pigment is specified.

"Ink mixture" is understood hereinafter to mean a pigment preparation or a pigment paste, i.e. a liquid in which pigments are dispersed.

"Medium" is understood hereinafter to mean a dispersant or dispersion medium, or a liquid in which at least one dispersed phase, for example pigments, is present.

"At least one metal oxide" and "at least one pigment" are understood hereinafter to mean that either one or more different metal oxides or pigments are present in the ink mixture. Unless stated otherwise, the terms "metal oxide", "metal oxides", "pigment" and "pigments" are also understood to have this meaning hereinafter.

The ink mixture is in the form of a suspension of these components, meaning that the solid pigments are dispersed in the liquid mixture. This suspension has very good stability of viscosity, since the metal oxides and pigments do not react with the mixture of medium and orthophosphoric acid. Thus, storage stability of the ink mixture, for example for at least twelve months, can be assured.

In addition, through suitable selection of the components, the ink mixture can be provided without toxic or environmentally hazardous constituents. Thus, the printable ink mixture conforms to RoHS (EU guideline relating to restriction of the use of certain hazardous substances in electrical and electronic equipment). For example, all components selected may be lead-free.

The pigment in the ink mixture may be selected from inorganic pigments. Any inorganic pigment can be used in the ink mixture, since it is compatible with the medium and the orthophosphoric acid and is adequately wetted by orthophosphoric acid and medium.

In one embodiment, the medium may be present in the ink mixture in a proportion of 25 to 45% by weight. The concentration of the medium can be used to establish the processing viscosity required according to the application in the suspension.

In addition, orthophosphoric acid may be present in the ink mixture in a proportion of 8 to 22% by weight. After processing of the ink mixture, i.e., for example, after the baking of the print on a glass or ceramic surface, the color print produced with the ink mixture including 8 to 22% by weight of orthophosphoric acid has sufficient bond strength, stability and abrasion resistance on the glass or ceramic surface. A proportion of less than 8% by weight of orthophosphoric acid in the ink mixture would reduce the bond strength, stability and abrasion resistance; a proportion of more than 22% by weight would enhance the corrosive character of the ink mixture, such that, for example, metal tools which are used to print on the ink mixture could be damaged. During the baking of the color print, the orthophosphoric acid is condensed to form cyclic metaphosphate and/or catenated polyphosphate. The vitreous structures formed here bond the pigment particles to one another and to the glass or ceramic surface.

The at least one metal oxide may additionally be present in the ink mixture in a proportion of 1 to 3% by weight. This achieves very good bond strength, stability and abrasion resistance. A proportion of less than 1% by weight of metal oxide in the ink mixture would lead to a decrease in the bond strength, stability and abrasion resistance of the color print. A proportion of more than 3% by weight does not bring about any further improvement in the abovementioned properties. It is thus possible to dispense with any higher proportion than 3% by weight of metal oxide in the ink mixture in order to save costs and material.

The at least one pigment may be present in the printable ink mixture in a proportion of 35 to 50% by weight. This brings about good hiding power and the desired color impression in the ink mixture, and in a color print produced therefrom. Below 35% by weight, the hiding power can decrease and lead to a pale appearance of the print produced from the ink mixture; above 50% by weight, the color print can take on a rough and porous appearance and lead to chalking of the pigments.

The metal oxide in the ink mixture may take the form of a nanopowder. This is understood hereinafter to mean that the metal oxide is in the form of a powder, and the powder includes particles whose average size is in the nanoscale range. Thus, the individual particles, called primary particles, of the nanopowder may have an average size of 15 to 20 nm, and the ink mixture may also include agglomerates of the particles which may have an average size of 30 to 100 nm.

The metal oxide present in the form of nanopowder may take on several functions in the ink mixture. As an adhesion additive, it improves the bond strength, abrasion resistance and chemical stability. As a thickener, the metal oxide prevents the sedimentation of the pigments in the ink mixture. This improves the storage stability.

The metal oxide may include a trivalent metal cation. For example, the metal cation may be selected from a group including cations of aluminum, scandium, yttrium and lanthanoids, for example lanthanum or gadolinium. It is thus possible to use nanopowders of, for example, aluminum oxide, yttrium oxide, gadolinium oxide or lanthanum oxide.

The use of scandium oxide, samarium oxide, dysprosium oxide, neodymium oxide and further lanthanoid oxides is likewise conceivable.

The selected metal oxides have a positive surface charge, which achieves good adhesion of the color print produced from the ink mixture on a negatively charged glass or ceramic surface. This effect may be brought about especially by means of nanopowders of the metal oxides mentioned. Nanopowders of $SiO_2$ lead, for example, to a less stable structure of the ink mixture, which means that a color print produced from such an ink mixture does not have sufficient adhesion, abrasion resistance and stability for a production application.

The medium may be glycerol. More particularly, the medium may include anhydrous glycerol. The glycerol may be used to adjust the processing viscosity of the ink mixture.

The orthophosphoric acid may include water in a concentration of 15%. Thus, the orthophosphoric acid may be 85% phosphoric acid. The use of less concentrated orthophosphoric acid is likewise possible.

The pigment in the ink mixture may be selected from inorganic C.I. pigments. C.I. pigments in this connection mean any pigment classified in the color index (C.I.). The C.I. index may be used to assign an unambiguous structure to any pigment, which means that unambiguous assignment of color pigments and a standard designation are assured. Any inorganic C.I. pigment may be used in the ink mixture, since it is compatible with the medium and the orthophosphoric acid and is sufficiently wetted by orthophosphoric acid and medium. It is thus possible to use the ink mixture to produce all colors desired according to the application as color prints. Mixtures of different inorganic pigments for production of mixed colors may also be present in the ink mixture.

The ink mixture may be lead-free. Thus, the ink mixture is nontoxic and nonhazardous to the environment, and conforms to RoHS.

A printable ink mixture according to the above details thus has a simple composition, with simultaneously great variability of the pigments usable and hence of the colors producible. In addition, the ink mixture is particularly storage-stable because of its composition, without occurrence of thickening or sedimentation.

Additionally specified is a process for producing a color print on a glass or ceramic surface. The process may include the steps of A) producing an ink mixture according to the above details, B) applying the ink mixture to the glass or ceramic surface, C) removing the medium from the ink mixture, and D) baking the ink mixture on the glass or ceramic surface to produce the color print.

The details given in relation to the printable ink mixture, with regard to the components thereof (medium, orthophosphoric acid, metal oxides and pigments) and the properties thereof, apply analogously in relation to the process in which the ink mixture is used.

This process may be performed in a particularly simple and rapid manner. For example, the time for production of the ink mixture in process step A) may be only up to a half hour, and the performance of process steps C) and D) may take only a few minutes. This constitutes a distinct simplification compared to existing processes, which are much more complicated, for production of color prints.

In process step A), the medium and the orthophosphoric acid may be mixed, and the at least one pigment and the at least one metal oxide may be dispersed in the mixture. Thus, for example, anhydrous glycerol and 85% phosphoric acid are mixed, one or more inorganic C.I. pigments are added and these are incorporated by means of a dispersing machine.

In the course of this, the processing viscosity may be adjusted by means of the content of medium in the ink mixture. For example, anhydrous glycerol may be present in the ink mixture in a content from the range of 25 to 45% by weight.

Subsequently, the metal oxides, for example aluminum oxide, yttrium oxide, gadolinium oxide or lanthanum oxide, may be added. These metal oxides may be present in the form of nanopowder. The dispersion takes place at room temperature and leads to deagglomeration and hence to individualization of the pigments and metal oxides. In the suspension produced in process step A), the metal oxides may be present as particles having a size of 15 to 20 nm, or as agglomerates having a size of 30 to 100 nm. The ink mixture may thus be produced in process step A) in one operation with one dispersing machine. Conventional preparation steps, such as ball milling or by means of a roll mill, are not required.

Process step B) may be effected by a method selected from a group including flexographic printing, stencil printing and screen printing. More particularly, flexographic printing may be selected as the method for application of the ink mixture to the glass or ceramic surface. Thus, the ink mixture may be applied to the glass or ceramic surface by an uncomplicated, easily performable method.

The ink mixture may be applied to the glass or ceramic surface in an unstructured or structured manner. By means of structured application, it is possible, for example, to apply manufacturer markings and/or trademarks to products having a glass or ceramic surface, as may be the case, for example, for luminous bodies.

For performance of process step C), a temperature selected from the range of 250° C. to 350° C. and a period selected from the range of 5 to 8 seconds may be selected. This thermal treatment may vaporize and/or decompose the medium, for example anhydrous glycerol having a boiling point of about 220° C. In this process step, it is additionally possible to remove the water with which the orthophosphoric acid, for example the 85% orthophosphoric acid, has been diluted. This thermal treatment can be effected, for example, by means of a gas burner with rotating movement of the glass or ceramic surface printed with the ink mixture past the gas burner. In this case, temperatures of, for example, 300° C. are attained, these being sufficient to remove the medium.

Process step D) may be performed at a temperature selected from the range of 450 to 650° C., preferably 480 to 620° C., and for a period selected from the range of 120 to 150 seconds. In this process step, the print on the glass or ceramic surface is baked. This can be effected, for example, in an open heating oven, for example a push-through oven, or in a closed heating oven, for example a chamber oven. In the oven, the baking can also be performed by means of temperature profiles, according to the application.

In this thermal process, the orthophosphoric acid is condensed to metaphosphates and/or polyphosphates. The result is a permanent, abrasion-resistant and stable, vitreous structure into which the pigments have been embedded. In the case of glass surfaces, the glass surface is simultaneously etched, so as to result in a firm bond between the glass surface and the ink mixture or the vitreous structure which forms, into which the pigments have been embedded. The result during the baking is thus a firm bond between the glass or ceramic surface and the color print, and simultaneously a firmly adhering, stable and abrasion-resistant structure into which pigments have been embedded. In addition, the metal oxide nanopowder as a means of adhesion is activated and improves the bond strength and abrasion resistance.

The color print which arises in process step D) is abrasion-resistant, and has high stability and good adhesion to the glass or ceramic surface. This is brought about, for example, through a proportion of orthophosphoric acid of 8 to 22% by weight in the ink mixture. This is converted to metaphosphate and/or polyphosphate in process step D). Thus, a vitreous structure forms, into which the pigments are embedded, and which is firmly bonded to the printed glass or ceramic surface. At the same time, the bond strength, stability and abrasion resistance are improved by the use of metal oxide, preferably in the form of nanopowder in a concentration of 1 to 3% by weight.

Additionally specified is the use of an ink mixture according to the above details for a color print on luminous bodies. Luminous bodies in this connection are understood to mean, for example, lamps, incandescent lamps or similar elements having a glass or ceramic surface.

The luminous bodies may be printed in a structured manner with the ink mixture, and it is thus possible, for example, to apply manufacturer markings or trademarks to the luminous bodies.

The use of the above-described ink mixture may enable a very stable and abrasion-resistant color print having good adhesion to the surface of the luminous body. The good adhesion on the surface may be brought about especially by virtue of the orthophosphoric acid present in the ink mixture being condensed by elimination of water to give metaphosphate and/or polyphosphate, and forming vitreous structures whose bond strength, stability and abrasion resistance is further improved by nanoscale metal oxides.

By virtue of the fact that any inorganic C.I. pigment may be used in the ink mixture, the color print on luminous bodies may have any color and any mixed color. The ink mixture on the luminous bodies may be applied in a structured or unstructured manner by means of a process according to the above details. Thus, it is possible to provide the luminous bodies with a color print by means of a simple process. In addition, it is also possible to provide an inexpensive ink mixture for the process, since inexpensive starting materials, especially the metal oxides, for example aluminum oxide, yttrium oxide, gadolinium oxide or lanthanum oxide, are used, compared to constituents used to date in ink mixtures. The production of the ink mixture and the process for producing the color print can additionally be performed very rapidly, which additionally includes a cost advantage.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows a schematic side view of a luminous body with a print

DETAILED DESCRIPTION

The following detailed description refers to the accompanying drawing that show, by way of illustration, specific details and embodiments in which the disclosure may be practiced.

Three working examples for ink mixtures are specified hereinafter. Because of the high variability, especially with regard to the pigments in the ink mixtures, these three working examples should be understood merely as examples for illustration. Any color not mentioned here can be produced as an ink mixture through use of other pigments.

1. Green Ink Mixture

| | |
|---|---|
| Anhydrous glycerol | 40.26% by wt. |
| 85% orthophosphoric acid | 15.09% by wt. |
| Aluminum oxide $Al_2O_3$ | 1.30% by wt. |
| (CO,Ni,Zn) (Ti,Al)$_2O_4$ (C.I. Pigment Green 50) | 33.59% by wt. |
| (Ti,Ni,Sb)$O_2$ (C.I. Pigment Yellow 53) | 9.76% by wt. |

2. Blue Ink Mixture

| | |
|---|---|
| Anhydrous glycerol | 32.86% by wt. |
| 85% orthophosphoric acid | 19.80% by wt. |
| Lanthanum oxide $La_2O_3$ | 1.82% by wt. |
| $CoAl_2O_4$ (C.I. Pigment Blue 28) | 45.52% by wt. |

3. Black Ink Mixture

| | |
|---|---|
| Anhydrous glycerol | 29.91% by wt. |
| 85% orthophosphoric acid | 20.74% by wt. |
| Yttrium oxide $Y_2O_3$ | 1.67% by wt. |
| $Cu(Cr,Fe)_2O_4$ (C.I. Pigment Black 28) | 47.68% by wt. |

In each of these working examples, the sum of all constituents adds up to 100% by weight. While the color which results in the green ink mixture is produced by a mixture of two pigments, the resulting colors of the blue and black ink mixtures are each produced by one pigment.

The ink mixtures mentioned are produced by mixing the anhydrous glycerol and the 85% orthophosphoric acid in the portions specified above. The respective pigment(s) is/are added to this mixture and incorporated by means of a dispersing machine. Finally, the particular metal oxide is added in nanopowder form and likewise dispersed. Thus, a viscous suspension is produced, which has good storability, since the metal oxides and pigments do not dissolve in the glycerol/orthophosphoric acid mixture. The presence of nanopowder additionally prevents the sedimentation of the pigments in the ink mixture. The nanopowder thus acts as a kind of spacer in the ink mixture.

According to the above details, the ink mixtures can be applied to glass or ceramic surfaces by a process for producing a color print, and are processed to give an abrasion-resistant, stable color print having good adhesion to the glass or ceramic surface.

As can be inferred from the working examples, the ink mixtures are simple lead-free compositions which are non-toxic and have high variability, since the selection of colors from the inorganic C.I. pigments is so great that any desired color can be produced. In addition, the ink mixtures, because of their composition, have particularly good storability.

FIG. 1 shows the detail of a schematic side view of a luminous body 10 with a print 2. Part of a tube 1 with a glass surface is shown, to which a print 2 has been applied. Also shown are the casing 4 and the connections 3. This luminous body is, by way of example, a strip lamp. Any other form of luminous bodies not shown here can likewise be provided with a print 2.

The color of the print 2 is, by way of example, black in this figure, but it may include any desired color according to the ink mixture from which the print 2 is produced. The print 2 in FIG. 1 shows the letter "X" repeated several times and in various sizes, which should be understood as an illustration. If the ink mixture, for example, is applied to the glass surface by means of flexographic printing and then baked thereon for production of the print, it is possible to show any desired sequence of characters. For example, the print may show manufacturer markings or trademarks.

While the disclosed embodiments has been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. A lead-free printable ink mixture consisting of:
a medium,
orthophosphoric acid,
at least one type of metal oxide nanoparticles, wherein the metal oxide nanoparticles comprise a trivalent metal cation selected from the group consisting of: cations of scandium, yttrium, and lanthanoids, and the metal oxide nanoparticles have an average primary particle size of 15-20 nanometers and an average agglomerate size of 30-100 nanometers, and
at least one pigment,
wherein the medium is present in a proportion of 25 to 45% by weight, the orthophosphoric acid in a proportion of 8 to 22% by weight, the metal oxide nanoparticles in a proportion of 1 to 3% by weight and the pigment in a proportion of 35 to 50% by weight,
wherein the medium is anhydrous glycerol, and
wherein the at least one pigment is suspended in the orthophosphoric acid.

2. A lead-free printable ink mixture as claimed in claim 1, wherein the orthophosphoric acid comprises water in a concentration of 15%.

3. A lead-free printable ink mixture as claimed in claim 1, wherein the pigment is selected from inorganic C.I. pigments.

4. A lead-free printable ink mixture as claimed in claim 1 that conforms to the EU guideline relating to restriction of the use of certain hazardous substances in electrical and electronic equipment (RoHS).

5. The lead-free pintable ink mixture of claim 1, wherein the at least one type of metal oxide and the at least one pigment do not react with the medium and the orthophosphoric acid, wherein the lead-free printable ink mixture has storage stability of at least twelve months.

6. The lead-free printable ink mixture of claim 1, wherein the lead-free printable ink mixture has storage stability of at least twelve months.

7. A process for producing a color print on a glass or ceramic surface, comprising:
producing a lead-free printable ink mixture, consisting of:
a medium,
orthophosphoric acid,
at least one type of metal oxide nanoparticles, wherein the metal oxide nanoparticles comprise a trivalent metal cation selected from the group consisting of: cations of scandium, yttrium, and lanthanoids, and the metal oxide nanoparticles have an average primary particle size of 15-20 nanometers and an average agglomerate size of 30-100 nanometers, and
at least one pigment,
applying the lead-free printable ink mixture to the glass or ceramic surface,
removing the medium from the lead-free printable ink mixture, and
baking the lead-free printable ink mixture on the glass or ceramic surface to produce the color print,
wherein the medium is present in a proportion of 25 to 45% by weight, the orthophosphoric acid in a proportion of 8 to 22% by weight, the metal oxide nanoparticles in a proportion of 1 to 3% by weight and the pigment in a proportion of 35 to 50% by weight,
wherein the medium is anhydrous glycerol, and
wherein during baking, the orthophosphoric acid is condensed to form at least one of cyclic metaphosphate and catenated polyphosphate.

8. The process as claimed in claim 7,
wherein the medium and the orthophosphoric acid are mixed in said producing, and
the at least one pigment and the at least one type of metal oxide nanoparticles are dispersed in the mixture.

9. The process as claimed in claim 7,
wherein said applying is effected by a method selected from a group comprising flexographic printing, stencil printing and screen printing.

10. The process as claimed in claim 7,
wherein said removing is performed at a temperature selected from the range of 250° C. to 350° C., and for a period selected from the range of 5 to 8 seconds.

11. The process as claimed in claim 7,
wherein said baking is performed as a temperature selected from the range of 450° C. to 650° C., and for a period selected from the range of 120 to 150 seconds.

12. A glass and/or ceramic surface comprising a lead-free printable ink mixture applied thereto; wherein the lead-free printable ink mixture consists of:
a medium,
orthophosphoric acid,
at least one type of metal oxide nanoparticles, wherein the metal oxide nanoparticles comprise a trivalent metal cation selected from the group consisting of: cations of scandium, yttrium, and lanthanoids, and the metal oxide nanoparticles have an average primary particle size of 15-20 nanometers and an average agglomerate size of 30-100 nanometers, and
at least one pigment,
wherein the medium is present in a proportion of 25 to 45% by weight, the orthophosphoric acid in a proportion of 8 to 22% by weight, the metal oxide nanoparticles in a proportion of 1 to 3% by weight and the pigment in a proportion of 35 to 50% by weight, and
wherein the medium is anhydrous glycerol.

13. The glass and/or ceramic surface as claimed in claim 12, wherein the orthophosphoric acid comprises water in a concentration of 15%.

14. The glass and/or ceramic surface as claimed in claim 12, wherein the at least one pigment is selected from inorganic C.I. pigments.

* * * * *